May 24, 1966  F. LUTHER  3,252,370
MICROFILM CAMERA
Filed Sept. 5, 1962  3 Sheets-Sheet 1
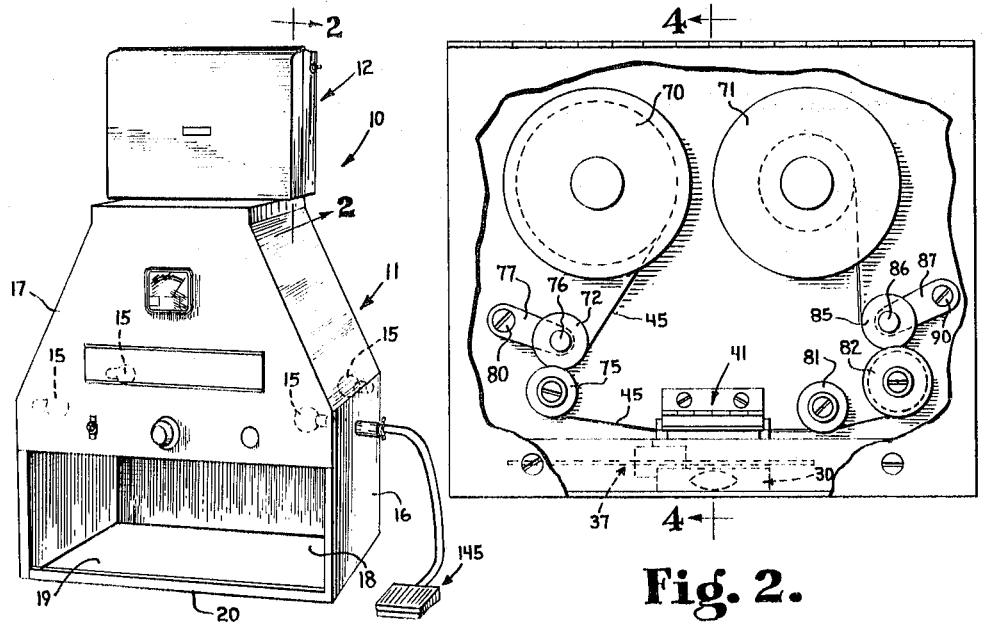
Fig. 2.
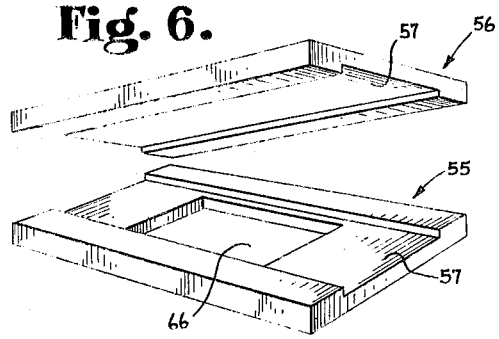
Fig. 1.
Fig. 6.
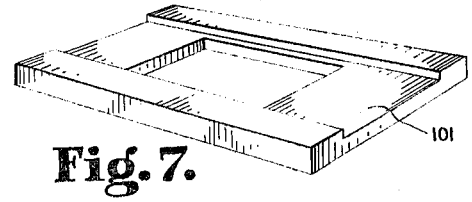
Fig. 7.
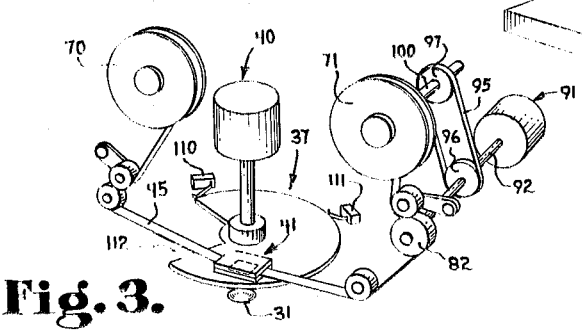
Fig. 3.
Fig. 8.
INVENTOR.
FREDERIC LUTHER
BY
Lockwood, Woodard, Smith & Weikart
Attorneys

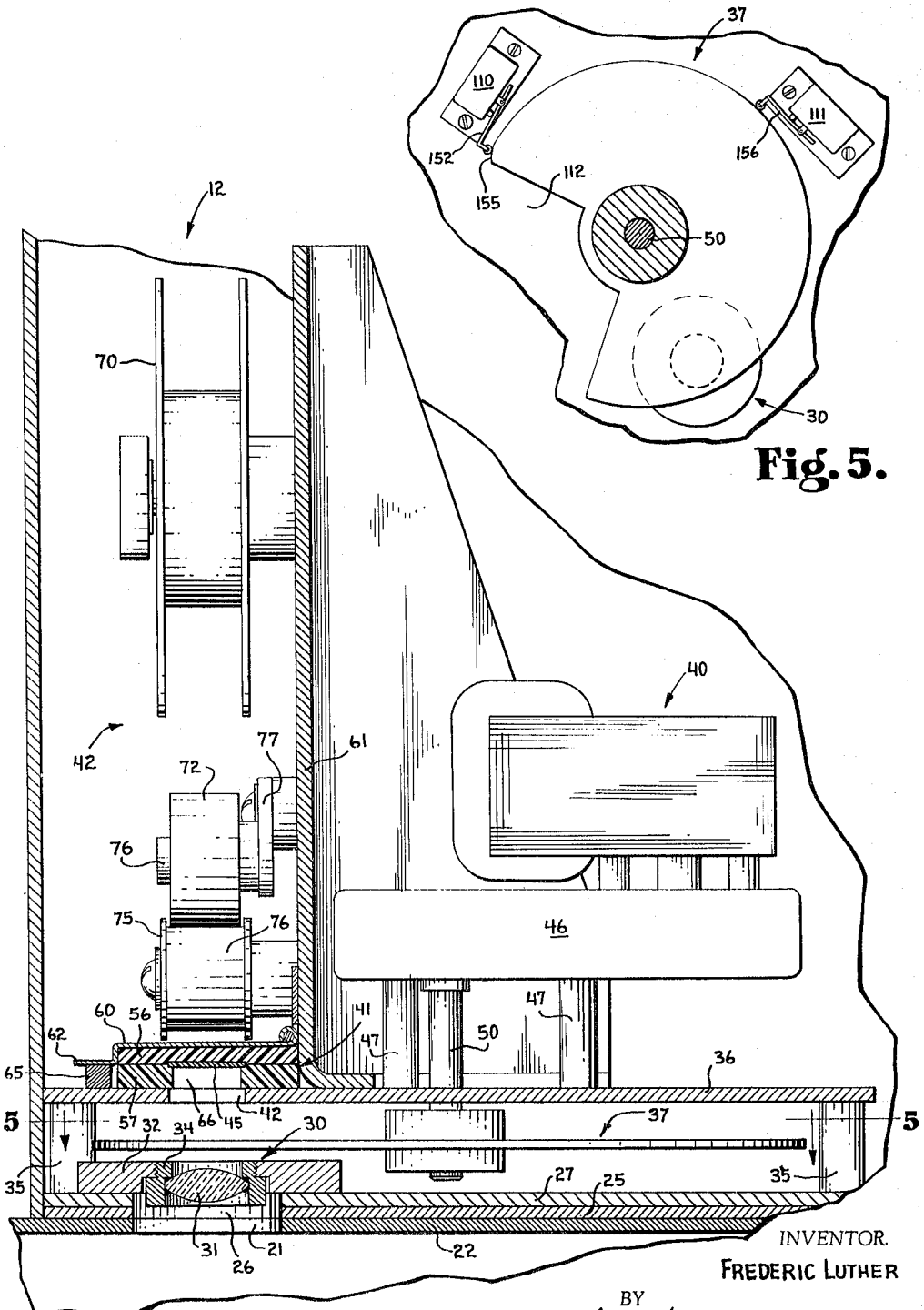

INVENTOR.
FREDERIC LUTHER

United States Patent Office 3,252,370
Patented May 24, 1966

3,252,370
MICROFILM CAMERA
Frederic Luther, P.O. Box 20224, 2803 E. 56th St.,
Indianapolis, Ind.
Filed Sept. 5, 1962, Ser. No. 221,512
1 Claim. (Cl. 88—24)

The present invention relates to a camera arrangement which finds particular utility as a portable microfilm camera.

Various cameras are available which are suitable for microfilming. Such cameras are either so expensive that they can be purchased by only relatively few or they are so cheaply constructed that for all practical purposes they are worthless. One reason for the extremely great cost of certain of these cameras is the camera's complicated means for exposing and indexing the film. One object of the present invention is to provide a less expensive camera arrangement incorporating relatively inexpensive, yet highly efficient and practical means for exposing and indexing the film.

Still another object of the present invention is to provide an improved film guide constructed to reduce or eliminate scratching and mechanical damage to the image bearing portions of the film and yet capable of holding the film in accurate register in the proper focal plane during exposure.

A further object of the present invention is to provide a portable camera arrangement which can be rapidly set up and operated and which is highly convenient and easy to operate.

Related objects and advantages will become apparent as the description proceeds.

One embodiment of the present invention might include a microfilm camera provided with a film guide composed of a material selected from the group consisting of tetrafluoroethylene, siloxane and acetal resin. The film guide includes a pair of blocks formed of said material. One of the blocks has a recess extending across one face thereof. The one block is held with said one face in engagement with the other of the blocks whereby a guide opening is formed through which film can be drawn. An aperture opens through the wall of the one block and leads into the recess whereby the film can be exposed.

The full nature of the invention will be understood from the accompanying drawings and the following description and claim:

FIG. 1 is a perspective view of a microfilm camera constructed according to the present invention.

FIG. 2 is an enlarged vertical section taken along the line 2—2 of FIG. 1 in the direction of the arrows.

FIG. 3 is a perspective view of the operating structure partially shown in FIG. 2.

FIG. 4 is an enlarged vertical section taken along the line 4—4 of FIG. 2 in the direction of the arrows.

FIG. 5 is a reduced horizontal section taken along the line 5—5 of FIG. 4 in the direction of the arrows.

FIG. 6 is a perspective exploded view of a film guide forming a part of the structure illustrated in FIGS. 2–4.

FIGS. 7 and 8 are films similar to FIG. 6 of alternative film guides useable in the present apparatus.

Figure 9:
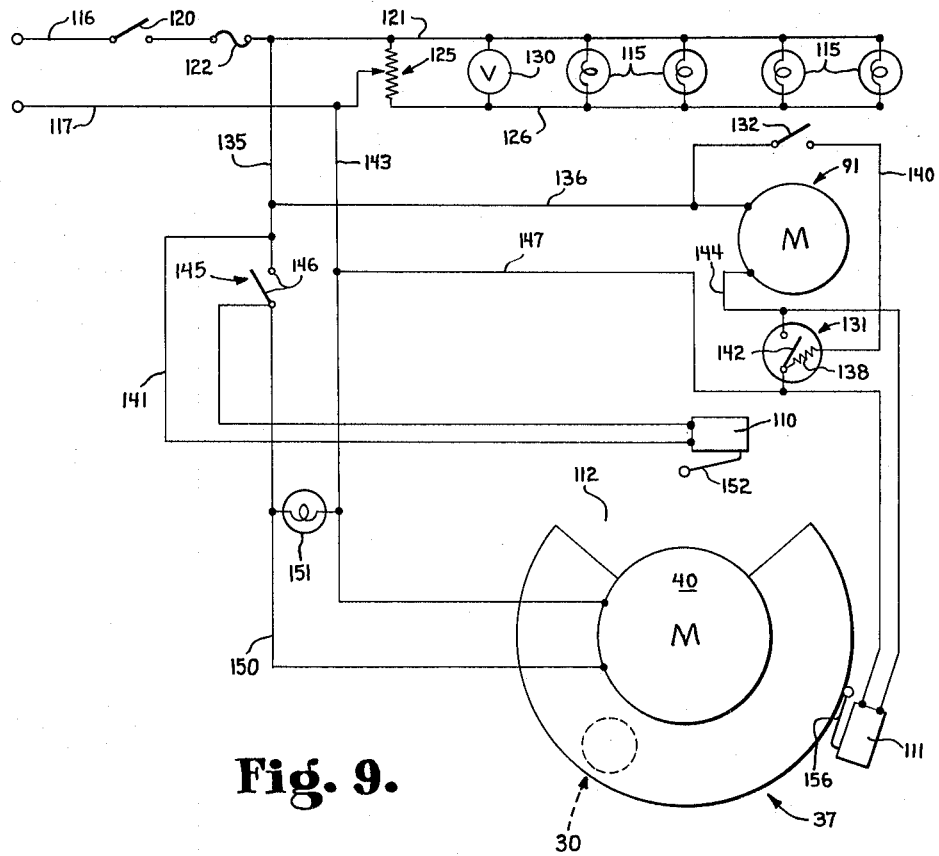
FIG. 9 is an electrical schematic of the present microfilm camera.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a microfilm camera 10 which includes a frame 11 and a camera unit 12. The camera unit 12 contains the film for the camera and also houses the various parts of the camera such as the shutter, lens, etc., which normally make up a camera. The frame 11 mounts light bulbs 15 used to illuminate the object being photographed and also functions to space the film unit or camera unit 12 a predetermined distance from the object being photographed.

The frame 11 has a rectangularly shaped lower portion 16 and has an upper portion 17 which is shaped as the frustum of a pyramid. The frame 11 is hollow and has a rectangular opening 19 in its bottom as well as a rectangular opening 18 in its front.

It should also be understood that the frame 11 is rigid and thus always maintains the same distance from its lower edge 20 and from its opening 19 up to an aperture 21 formed in the top 22 of the frame. The aperture 21 is centrally located; that is, it is located directly above the center of the opening 19. The camera unit 12 is mounted directly above the aperture 21 so that the light from the object being photographed moves through the aperture 21 into the camera unit.

The ease with which the present device can be set up at a new location will be evident and results partially from the fact that the device is already set up and the frame 11 maintains its rigid condition. Only a simple step, described below, is necessary in order to prepare the device for taking pictures. This step is automatically carried out by the camera while the operator is assembling the objects to be photographed. Thus, the microfilm camera 10 can be carried into an office and can be placed upon, for example, a large engineering drawing with the drawing exposed through the opening 19. After the above mentioned preparation, the camera is then operated and the device is repeatedly positioned across a drawing whereby photographs are repeatedly taken through the opening 19. Alternatively, objects to be photographed can be placed in position for photographing through the opening 18.

Referring more particularly to FIGS. 2–8, the structure of the camera unit is shown in detail. As can be seen from FIGS. 2 and 4, the camera unit 12 is mounted directly upon the top 22 of the frame 11. The camera unit has a bottom 25 through which is formed an aperture 26 which is positioned in registry with the aperture 21. Fixed to the bottom 25 is a further plate 27 which mounts lens assembly 30 which is identical to conventional lens structure. It will be noted that the lens 31 can be moved upwardly or downwardly within the lens mounting member 32 by rotation of screw threaded member 34 to adjust the focus of the camera. Normally, however, this focus will be set at the factory and will not be modified inasmuch as the opening 18 is spaced a predetermined distance from the lens so that the image produced by the lens will also be a predetermined distance therefrom.

Mounted upon the plate 27 by means of posts 35 is a further plate 36 which supports a rotatable shutter 37, a shutter drive motor 40, a film guide 41 and various reels and rollers 42 for the film.

Referring to FIGS. 3, 5 and 9, the shape of the shutter 37 is shown in more detail as circular with what approximates a 90° sector cut therefrom. The shutter 37 is positioned between the lens 30 and the film guide 41 which is mounted on the plate 36 over an opening 42 in the plate. The shutter 37 is rotated by the motor 40 to alternately expose and mask the film 45 as it moves through the film guide 41. The motor unit 40 which may be, for example, a Dayton 1/70 hp. magnetic brake, 25 r.p.m., 10 inch lb. torque motor manufactured by the Dayton Electrical Manufacuring Company of Chicago, Illinois, includes a transmission unit 46 and is mounted upon the plate 36 by posts 47. The shutter 37 is mounted upon the drive shaft 50 of the motor or motor unit 40.

The film unit 41 includes a pair of blocks 55 and 56, the shape of which is shown in better detail in FIG. 6. Each of the blocks 55 and 56 has a recess 57 which extends longitudinally of the block and which may have a depth approximately equal to one-half of the thickness of the film to be guided by the film guide. Referring to FIG. 4, the upper block 56 is secured to a hinge member 60 which is pivotally connected to a support 61 fixed to the plate 36. In order to thread the film through the film guide, the hinge member 60 may be lifted by means of a handle 62 which is normally supported upon the block 65. The film is then placed within the lower recess 57 and the film guide closed so that the film extends through the film guide. In the lower block 55 which is fixed to the plate 36, there is formed a rectangular opening 66 which leads into the recesses 57 of the block. Thus, the film can be exposed through the opening 66. A highly important feature of the present invention is the fact that the blocks 55 and 56 are formed of a low friction material which does not permit scratching or mechanical damage to the image bearing portions of the film as it passes through the film guide. This low friction material can be one of the tetrafluoroethylenes or polytetrafluoroethylenes known by the trademark Teflon, a polymerized organic siloxane known by the trademark Silicone or any of the acetal resins (a highly crystalline stable form of formaldehyde) such as those known by the trademark Delrin. The material must meet the requirements, however, of holding the film in accurate register. (In other words, the material should be rigid and resistant to wear.) The material should also have low friction so that scratching and mechanical damage of the film does not occur.

The means for indexing the film between each exposure is best shown in FIGS. 2 and 3 and includes a pair of reels 70 and 71, the reel 71 being the take-up reel and the reel 70 being the fresh supply. The film 45 is drawn between the rollers 72 and 75, the roller 72 being a downwardly spring pressed idler roller and the roller 75 being a tracking roller having a shallow recess 76 in its external periphery for reception of the film 45. The idler roller 72 is rotatable upon a shaft 76 which is fixed to a pivotal arm 77 pivotally secured to the support 61 about an axis 80.

The tracking roller 75 guides the film between the blocks or plates 55 and 56 which make up the film guide 41. The film then travels below a further tracking roller 81 rotatably mounted on the support 61 and having an external shallow recess for guiding the film. The film then travels between a drive roller 82 and a further spring pressed idler roller 85 which is rotatably mounted upon the shaft 86, which is in turn fixed to the arm 87 for pivoting about axis 90. It will be noted that the drive roller 82 is provided with a shallow recess in its external periphery for guiding the film 45. The film next travels onto the take-up reel 71.

Referring to FIG. 3, the operating structure of the camera unit is clearly shown as including the motor 40 for rotating the shutter 37 and as additionally including the motor 91 which drives the roller 82. The connection between the motor 91 and the roller 82 is positive while the connection between the take-up reel 71 and the output shaft 92 of the motor 91 is a clip connection. Thus, the belt 95 is relatively loosely received upon pulleys 96 and 97 fixedly mounted respectively on the shafts 92 and 100, the take-up roller 71 also being fixedly mounted on the shaft 100. By means of the above described arrangement, a constantly present tension is maintained on the film 45, tending to wind it on the take-up roller 71. However, the amount of film and thus the diameter of winding of the film on the take-up roller does not affect the amount of indexing of the film by the motor 91. Instead, the amount of winding on the reel 71 is determined by the movement of the external periphery of the drive roller 82. This amount of movement is always the same for a given amount of rotation of the motor 91.

Referring to FIGS. 7 and 8, alternative forms of the film guide unit are illustrated and are identical to the form shown in FIG. 6, with the exception that the recesses 57 are replaced by a single recess 101 and 102 which can be formed in either the upper or the lower block.

The operation of the present apparatus will be described in connection with the electrical circuit of the apparatus. As is shown in FIGS. 3, 5 and 9, a pair of microswitches 110 and 111 are mounted for actuation by the shutter 37. The normally open microswitch 110 is associated with the motor 40 while the normally closed microswitch 111 is associated with the motor 91. The microswitch 110 is open when its arm is projected as shown in FIG. 9 and received within the recess 112 in the shutter or cam 37 as shown in FIG. 9. Thus, FIG. 9 shows a starting or at rest position of the apparatus while FIGS. 3 and 5 show other operating positions of the apparatus.

Assuming that it is desired to operate the apparatus, the electrical circuit is plugged in, placing a voltage across the wires 116 and 117. The line switch 120 is closed, causing a voltage drop to be placed across the wires 121 and 117 through the fuse 122. A voltmeter 130 and four lamps 115 are connected across the wires 121 and 126. A variable resistor 125 is connected across the wires 121 and 117 so that the voltage across the wires 126 and 121 and hence the light intensity of the lamps 115 can be varied by adjusting the resistor. It will be understood that other means, such as the variable impedance provided by a variable transformer, could be utilized in place of the variable resistor to adjust the voltage across wires 121 and 126. This adjustment may be made by the camera operator to provide differing light intensities as required, for example, in microfilming documents of various colors.

It should be mentioned that in assembling the present device, the lamps 15 are carefully matched to make sure they are all of equal intensity and that they all produce a given amount of illumination for a given amount of voltage. The voltmeter 130 provides a visual reference permitting the operator to readjust back to a reference voltage (or light intensity) after a temporary change in the adjustment.

Assuming that the operation of the camera is just being started and that none of the film has yet been reeled onto the take-up reel 71, it will first be necessary to unreel approximately 6 feet of the film on the reel 70 in the darkness of the closed camera unit housing. This step is necessary because of the fact that the film on the reel 70 will be fogged at the outer periphery of the reel. This unreeling is accomplished by means of a delay relay 131. Such a delay relay is of a conventional, closed cold, thermal time delay type and may be, for example, an Amperite 115–N–060 or may be a G–V Controls tube DT–7053 manufactured by G–V Controls, Inc. of Livingston, New Jersey. The function of the relay 131 is to bypass the microswitch 111 and to close the circuit to the motor 91 for a predetermined period of time such as, for example, sixty seconds whereby a predetermined portion of the film (for example, six feet) is unreeled from the reel 70. The delay relay 131 is controlled by a manually operated heater switch 132 which is connected to the line 121 through the lines 135, 136 and 137 and which is connected to the heater portion 138 of the tube 131 through the line 140. The circuit of the heater portion 138 is completed through the line 141 and the line 143 which leads to the line 117.

When the switch 132 is closed, the heat produced by the heater 138 opens the contacts 142 after for example, a time delay of sixty seconds. The circuit to the motor 91 is initially closed through the line 116, contacts 120, fuse 122, lines 135 and 136, the motor 91, line 144, contacts 142, lines 141, 143 and 117. Thus, the motor 91 is immediately energized upon closing of the switch 120 and, assuming the manually operated switch 132 has also been closed, the motor 91 remains energized for sixty seconds at which time the contacts 142 open to halt motor 91. Thus, the motor 91 will be energized and will operate for this sixty second period and will wind onto the reel 71 the desired fogged six feet of film at the outside of the reel 70.

The above described delay relay can be used to unreel the fogged portion of the film while the operator of the camera is assembling objects to be photographed. For example, the present device might be used by an FBI agent who enters an office and wishes to photograph documents from the files in the office. The camera is merely plugged in placing a voltage across the lines 116 and 117, the switch 121 and the heater switch 132 are closed and sixty seconds later the camera is ready for operation and photographing of the documents.

The actual photographing operation is accomplished as follows:

A foot operated switch 145 is provided and includes contacts 146 which are spring biased to the open condition illustrated in FIG. 9. The operator depresses the foot switch 145 causing the contacts 146 to be closed bypassing the microswitch 110. The closing of the contacts 146 makes a circuit to the motor 40 and to an indicator light 151, this circuit being made through the lines 117 and 135, the switch 145 and the line 150, the motor 40 and the light 151, the line 143, the variable resistor 125, the line 121, fuse 122, switch 120 and the line 116. The motor 40 is caused to rotate causing rotation of the drive shaft 50 and the shutter 37.

As can be seen from FIG. 9, the starting position of the shutter 37 is such that the actuating arm 152 of the microswitch 110 is projecting into the recess 112. Rotation of the shutter 37 causes the shutter to engage and cam against the arm 152 moving it to the position shown in FIG. 5. It will be noted that the shutter 37 has a rounded off corner 155 which smooths out the depression of the arm 152.

The shutter 37 continues rotation until it moves to a position wherein the open section 112 of the shutter is positioned between the lens 31 and the film guide 41. Thus, light can pass upwardly from the frame 11 into the camera unit 12. Also, the image of the object at the opening 19 is placed on the film 45 through the apertures 42 and 66 in the plate 36 and block 55, respectively. The motor 40 is capable of rotation at a constant speed and therefore, the passage of the opening 112 in the shutter across the area between the lens and the film guide takes a precise predetermined period of time sufficient to give exactly the desired exposure to the film 45. One example of a motor capable of carrying out this desired function has been given above in the description of the motor unit 40.

As mentioned, the depression of the actuating arm 152 occurs at the beginning of the cycle of rotation of the shutter 37. Such depression locks in the motor by reason of the fact that the contacts of the microswitch 110 are closed and the motor is maintained energized. Thus, the motor continues rotation until the shutter again blocks the passage of light from the lens 31 to the film 45.

Continued rotation of the shutter 37 causes the actuating arm 156 of the microswitch 111 to project into the opening 112 in the shutter. Such projection of the actuating arm 156 causes closing of the contacts of the microswitch 111. Thus, a circuit is made to the motor 91 energizing that motor and causing it to rotate its drive shaft 92 and the drive roller 82. Rotation of the motor 91 also drives the reel 71 whereby film is wound on the reel and is moved through the film guide 41. The motor 91 is so geared that energization thereof for the period determined by the length of the opening 112 in the shutter produces the desired stepping of the film through the film guide. In other words, it is desired that the film be stepped at least the length of the aperture 66 and preferably a greater distance so as to leave unexpected portions between the exposed portions of the film. The motor 91 is capable of so stepping the film and of stepping the film almost precisely equally at each energization. A motor which is capable of such operation is a Hurst motor PCRSM-30 clutch, 30 r.p.m., 80 inch-ounce torque, manufactured by the Hurst Manufacturing Company of Princeton, Indiana.

After the film has been stepped the desired distance by the motor 91, the continued rotation of the shutter 37 causes the advancing section of the shutter to redepress the arm 156 thereby breaking the circuit to, and stopping, motor 91. The shutter 37 continues rotation until the open space 112 again frees the actuating arm 152 of the switch 110. Such operation breaks the circuit to the motor 40 and the device is in readiness for a further cycle.

From the above description, it will be evident that the present camera arrangement provides a relatively inexpensive structure which incorporates highly efficient and practical means for exposing and indexing the film. It is possible to conceive of apparatus which would incorporate only a single drive motor for rotating the shutter and for transporting the film. However, motors such as the motor 40 and 91 are relatively inexpensive. Furthermore, a single motor accomplishing the same tasks as the motor 40 and 91 would also require a relatively complicated mechanical operating connection to both the shutter means and the film transport means.

It should also be emphasized that a further important feature of the present invention is the film guide 41 which obviously is relatively simple in construction. Even so, this film guide provides its intended function in a highly efficient manner and eliminates scratching and mechanical damage to the film. Obviously such scratching and mechanical damage could have very undesirable results in view of the fact that the information on the microfilm will later be multiplied many times in size. Preferably, the film guide blocks 55 and 56 are formed of tetrafluoroethylene or one of the polytetrafluoroethylenes.

Also, from the above description, it will be evident that the present invention provides a portable camera arrangement which can be rapidly set up and operated and which is highly convenient and easy to operate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A microfilm camera comprising a rigid hollow frame having a rectangularly shaped lower portion and an upper portion which is shaped as the frustum of a pyramid, said frame having a rectangular opening in its bottom, lights mounted in said frame at the junction of the rectangularly shaped portion and the frustum, said lights each being located adjacent one of the corners of said frame and equally spaced from said rectangularly shaped opening, means for adjusting the voltage supply to each of said lights, a camera housing mounted on the top of said frame, said housing and frame having registering apertures therethrough which are located centrally relative to said opening, a film guide mounted in said housing and centered over said opening, a lens mounted directly between said film guide and said apertures with the axis of the lens passing through the center of said film guide and apertures, a pair of reels rotatably mounted in said housing, a first motor for driving one of said reels to take up film thereon from the other of said reels and through said film guide, a shutter rotatably mounted within said housing between said lens and said film guide, a second motor for rotating said shutter, said film guide having an aperture therethrough in alignment with said first mentioned aperture whereby rotation of said shutter exposes film in said film guide to light passing through said lens, and control means for actuating said second motor to rotate said shutter to expose the film and for then actuating said first motor to rotate said one reel to index a further portion of said film, said film guide including a pair of blocks composed of an opaque polytetrafluoroethylene, said blocks each having a recess therein extending across one face thereof, said blocks having said one face in engagement and said recesses in registry whereby a guide opening through said film guide for said film is formed, said aperture being through the wall of one block.

References Cited by the Examiner

UNITED STATES PATENTS

| | | | |
|---|---|---|---|
| 2,166,419 | 7/1939 | O'Neill | 84—24 |
| 2,211,827 | 8/1940 | Kindelmann | 352—221 |
| 2,369,247 | 2/1945 | Pratt | 88—24 |
| 2,371,542 | 3/1945 | Place | 88—24 |
| 2,478,641 | 8/1949 | Rose et al. | 88—24 |
| 2,645,170 | 7/1953 | Heidecke | 95—31 |
| 2,649,018 | 8/1953 | Schnetzer | 88—24 |
| 2,682,193 | 6/1954 | Schubert et al. | 88—24 |
| 2,748,651 | 6/1956 | Simjian | 88—24 |
| 2,834,273 | 5/1958 | Bartilotta | 88—24 X |
| 3,029,687 | 4/1962 | Veit | 88—17 |
| 3,046,833 | 7/1962 | Harvey et al. | 352—221 |
| 3,110,237 | 11/1963 | Scholkemeier et al. | 95—31 |

OTHER REFERENCES

Kloepfel, D. E.: Nonferrous Materials for Projector Film Shoes, volume 71, Journal of the Society of Motion Picture and Television Engineers, July 1962, page 509.

NORTON ANSHER, *Primary Examiner.*

R. A. WINTERCORN, *Assistant Examiner.*